June 24, 1941.  L. J. JUMAU  2,247,091

STORAGE BATTERY

Filed May 19, 1937  2 Sheets-Sheet 1

Inventor:
Lucien Jules Jumau
by Edward H. Palmer
Atty

June 24, 1941.　　　　L. J. JUMAU　　　　2,247,091

STORAGE BATTERY

Filed May 19, 1937　　　　2 Sheets-Sheet 2

Inventor:
Lucien J. Jumau
by Edward H. Palmer
Attys.

Patented June 24, 1941

2,247,091

UNITED STATES PATENT OFFICE 2,247,091

STORAGE BATTERY

Lucien Jules Jumau, Paris, France

Application May 19, 1937, Serial No. 143,541
In Germany May 27, 1936

5 Claims. (Cl. 136—63)

This invention relates to storage batteries and has for its object to provide certain combinations of parts of the battery, such as the plates, separator means and/or diaphragms, in the form of units for example, and the novel method or mode and manner of making such combinations.

The invention and its aims and objects will be readily understood from the following description of my novel method or mode and manner of carrying out my invention, and of certain illustrative embodiments of the novel products of said method shown in the accompanying drawings, the true scope of the invention being more particularly pointed out in the appended claims.

Figure 1:
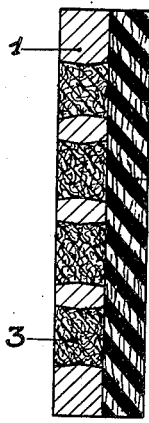
Fig. 1 shows one illustrative unit in accordance with my invention, said unit comprising an electrode, a diaphragm and active material.

Storage batteries are usually assembled by placing insulating separator or spacing means that are proof against attack by the active material, between the plates of opposite polarity, so as to secure a uniform separation or spacing of said plates and avoid any interior leaks resulting either from direct contact between the plates or by indirect contact thereof resulting from falling active material or paste.

In certain cases diaphragms are used to supplement the separator means, said diaphragms being applied directly upon the active material and forming a continuous screen and thus more efficaciously preventing leaks and mechanically retaining the active materials, while being sufficiently porous not to impair the passage of the current and the diffusion of the electrolyte.

To be efficient such diaphragms must be intimately applied to the active materials of the plates. This condition has heretofore been difficult of realization owing to the unavoidable irregularity or unevenness in the plates, separator means or diaphragms themselves, as well as owing to possible deformation or distortion of these parts.

Attempts to overcome this difficulty by securing separator means or diaphragms to the plates by an adhesive previously prepared, have been unsuccessful for the same reasons above given.

It has also been proposed to construct the separator or spacing means directly upon the surface of the plates, but said means are either not sufficiently porous or they are made entirely of rubber which rapidly deteriorates when brought into direct contact with the electrolyte as it necessarily must be.

One of the objects of the present invention is to provide a diaphragm constructed on the plate and which is durable, economical and otherwise perfectly satisfactory.

Another object is to provide a combined plate and separator means for storage batteries, which contains porous rubber, which may be macroporous or microporous, and in which the separator means or diaphragm is constructed upon the plate itself so as to adhere thereto, said separator means comprising insulating unattackable mineral fibres, for example of glass, silica or quartz, agglomerated with the rubber, said plate and separator means or diaphragm thus forming a unit.

In accordance with another feature of the invention, a diaphragm fixed to the plate may be inserted or interposed between the plate and separator means, the latter being preferably of macroporous or microporous rubber and may be constructed upon said diaphragm itself. Said separator means may be in the form of a box of which the plate forms the cover, the diaphragm occupying the empty space within said box the edges of which rest upon the electrode frame.

If as it frequently happens both surfaces of the plate are provided with active material, one may, in accordance with my invention, cover the plate completely, including its surfaces and edges, with a diaphragm, or one may construct a diaphragm upon each surface of the plate. One may also cover by a diaphragm, a layer of porous material for example, only those parts of the grid containing the active material.

The present invention also contemplates the provision of various combinations in a storage battery cell comprising two electrodes, for example, for the purpose of simplifying the assembling of the cell. Thus one of the plates, preferably the positive plate, may be combined with a diaphragm to form a unit, and, in order to maintain the separation or spacing, removable separator means may be interposed between said positive plate and diaphragm unit and the negative plate. Or one of the plates, more especially the positive plate, may be made integral with separator means, with a diaphragm interposed at the time of manufacture of said two separator means. In assembling the cell it is thus only necessary to juxtapose a negative plate to the unit thus formed. Or each plate may be united by its active surface to a diaphragm constructed upon said surface, and in assembling separator means will be interposed between the two diaphragms. As a further solution, the two plates may be themselves united to form a single piece, separator means being interposed between said plates and separated from each plate by a diaphragm, so that the assembling of the parts of the cell is thus reduced to placing this single unit in the battery box.

Other solutions may be provided for assembling the parts, according to the particular shape of separator means and diaphragms used, but in general they will be found to fall within one or another of the solutions above described.

Any type of plates may be used with my invention, such as Planté plates, plates of large surface, Faure plates or oxide plates in the case of lead storage batteries, or plates of any other type. Any known separator means may be used, especially those made of porous or microporous ebonite.

Referring to the drawings, an electrode or plate is designated by 1, a diaphragm of mineral fibres or threads such as threads of glass, silica or quartz, is indicated by 2, said fibres or threads being agglomerated in porous (macroporous or microporous) rubber. The active material of the electrode is indicated by 3 and separator means of porous rubber is indicated by 4.

Figure 2:
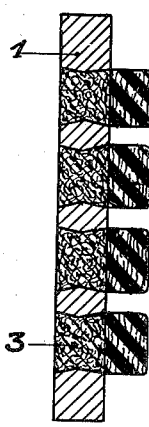
Fig. 2 shows an illustrative unit comprising similar parts, the diaphragm covering only the active material.
Figure 3:
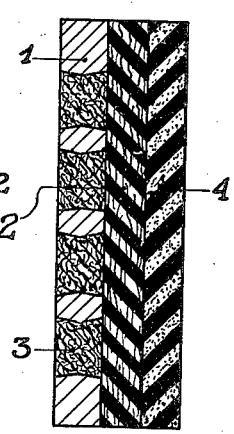
Fig. 3 shows a structure similar to Fig. 1 with separator means.

In Fig. 2 the diaphragm is formed of distinct portions which cover only the active material. The same is true of Fig. 5.

Figure 4:
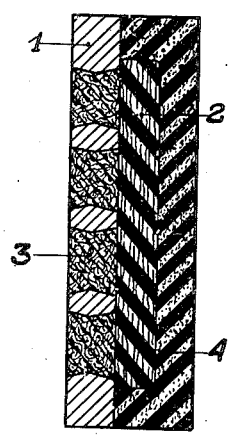
Fig. 4 shows a particular form of separator means adapted to contain a diaphragm.
Figure 5:
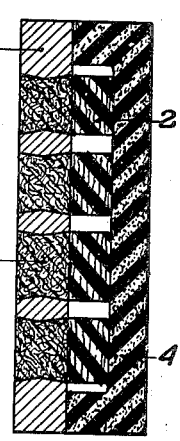
Fig. 5 is similar to Fig. 4 having the diaphragm formed as in Fig. 2.

In Figs. 4 and 5 the separator means is in the form of a box of which the edges bear upon the frame of the electrode, and the diaphragm is located within the empty space between the electrode and said separator means.

Figure 6:
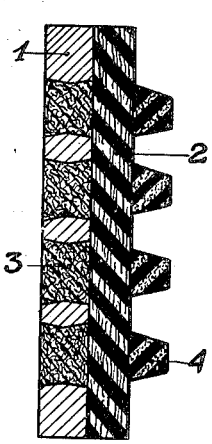
Fig. 6 shows a structure similar to Fig. 3 but with separator means in the form of ribs.

In Fig. 6 the separator means is formed entirely of ribs.

In practising my invention for making the above described combined plates and separator means and diaphragms, I may proceed in different ways, in all of which the plates may be utilized either before or after their formation. By formation is meant that operation by which the material, with which the interstices of the grids are filled and which comprises different oxides and lead salts, is converted into active material.

Figure 9:
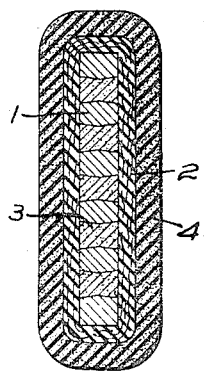
Fig. 9 shows a modification in which a plate or electrode is entirely enveloped in a diaphragm.

In accordance with one mode and manner of proceeding, a plate, having its two surfaces filled with active material, is first covered with insulating, unattackable mineral fibres or threads and then dipped in latex of rubber containing the material necessary to transform the latex into porous (macroporous, microporous) rubber after coagulation of the deposit and vulcanization under suitable conditions. A plate entirely enveloped in a diaphragm 2 is thus obtained, see Fig. 9, said plate and its envelope being intimately connected or bound together at all points. By repeating the dipping operation, the coagulation and vulcanization, a combined triple unit of plate, diaphragm and separator means will be obtained.

The following is one illustrative mode of transforming latex into microporous rubber. Very finely divided sulphur is first added to the rubber latex which is then transformed into a homogeneous, continuous and firm jelly by the addition of alkaline-earth salts or sulphur dioxide gas or liquid acids, after having added to the latex a thickening agent, such as a hot saturated solution of alum. The jelly thus obtained is then vulcanized by heating in water or steam. A body is thus obtained which, after drying, is permeated by an infinite number of small microscopic pores.

To produce macroporous rubber, powdered sulphur, small particles of gum arabic, of agar-agar, or other similar material are added to the latex or to rubber dispersed in water, which is distributed throughout the entire mass of latex. Coagulation is then effected by the addition of zinc oxide, for example. Vulcanization is then effected by heating in warm water, whereby the small particles of gum arabic are eliminated little by little by the warm water and there finally remains a macroporous rubber, the size of the pores of which is determined by the size of the small particles of gum arabic initially added to the latex.

By this same method and taking the necessary precautions the plate may be covered, if desired, with a diaphragm that shall cover only one of its surfaces or only those parts of the grid provided with active material. To accomplish this result it will suffice to cover with a mask or any other suitable protective layer, those conductive portions of the plate upon which it is not desired to deposit the porous covering.

In accordance with my invention also a plate may be provided upon one or both surfaces with separator means by molding. To this end the plate having previously been covered with insulating and unattackable mineral fibres or threads is placed at the bottom of a mold of suitable shape and a coagulum of latex of suitable composition is poured onto it and vulcanization is effected. The diaphragm then adheres throughout its entire surface to the base plate. By this method, see Fig. 6, if the diaphragm be provided with ribs upon one or both its surfaces, produced for example by using a mold provided with suitable grooves, the ribs thus formed upon the diaphragm will act as separator means. A combined unit comprising a plate, a diaphragm and separator means is thus readily obtained.

Figure 7:
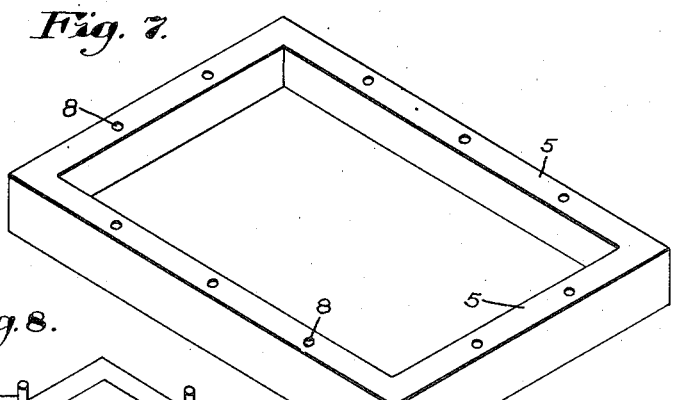
Figs. 7 and 8 show an example of a mold which may be used in practising my invention.
Figure 8:
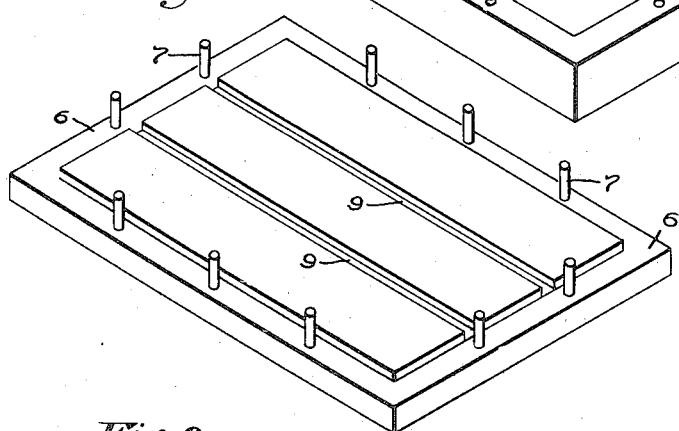

Any suitable mold may be used for the above purpose, that shown in Figs. 7 and 8, for example, which may comprise two parts 5 and 6, the latter being superposable upon the former. Suitable means is provided to cause said parts suitably to register when superposed, such as pins 7 upon the marginal portion of part 6 to engage holes 8 provided in the marginal portion of part 5, in position to register with said pins 7 when part 6 is placed upon part 5. Part 5 is that part of the mold in the bottom of which the plate or electrode is placed as above described. Grooves for providing ribs on the diaphragm as above described are shown at 9 in part 6 of the mold. If no ribs are to be provided upon the diaphragm these grooves will of course be omitted.

Another way which may be used with advantage consists in depositing by electrophoresis, upon a part or upon the whole of a plate previously provided with insulating and unattackable mineral fibres or threads, a layer of porous (macroporous, microporous) rubber from a bath of definite conductivity, said layer of rubber being thereafter vulcanized in resisting the escape of water.

Figure 10:
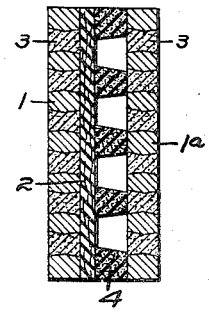
Fig. 10 shows a positive electrode, a diaphragm, separator means and a negative electrode, formed as a unitary structure by molding.
Figure 11:
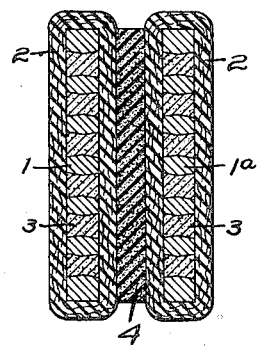
Fig. 11 shows a unitary structure similar to that of Fig. 10, in which both electrodes are enveloped in a diaphragm.

By a suitable use of the modes and manners of practising my invention above described, one may provide upon the same plate or electrode, superposed layers of different degrees of porosity, the layers of greater porosity being nearest the plate. It is thus possible to construct, by a single or a plurality of molding operations, a single block or unit comprising a positive plate or electrode 1, a diaphragm 2, separator means Fig. 4 and a negative plate or electrode 1a, as shown in Fig. 10. This same result may be obtained by first dipping each plate or electrode in latex and then coagulating and vulcanizing so as to cover each of them with a diaphragm 2, see Fig. 11, whereupon the two blocks thus obtained are united by the interposition of separator means, by molding for example or simply by applying a readymade separator means by the help of a latex adhesive.

The present invention not only greatly simplifies the assembling of the parts of a storage battery, by the use of the unit comprising a plate and separator means, as well as the other units described, but the life of the plates, and particularly of the positive plates is prolonged materially, as the perfect adherence between diaphragm and plate absolutely prevents the falling out of the active material, and the construction of the diaphragm enables it successfully to resist attack by the active material.

I am aware that the invention may be embodied in other specific forms without departing from the spirit or essential attributes thereof and I therefore desire the present description to be considered in all respects as illustrative and not restrictive, reference being had to the appended claims rather than to the foregoing description to indicate the scope of the invention.

I claim:

1. A combined electrode, diaphragm and separator, for storage batteries, comprising an electrode; a diaphragm adhering to said electrode and comprising unattackable, insulating mineral fibres agglomerated with porous rubber; and a separator adhering to said diaphragm and consisting of a porous rubber box of which the electrode forms the cover, the edges of said box adhering only to the edge portion of said electrode and said diaphragm being contained within said box, said electrode, diaphragm and separator forming a unitary structure.

2. Process for making a combined electrode, diaphragm and separator in a mold, which comprises applying a layer of unattackable, insulating, mineral fibres to an electrode; covering the electrode and said fibres with rubber latex; allowing said latex to penetrate completely through said fibres to the surface of the electrode, said latex after penetration being of greater thickness than said layer of fibres; and effecting coagulation and vulcanisation in the mold.

3. Process of making a combined electrode, diaphragm and separator in a ribbed mold, which comprises applying a layer of unattackable, insulating, mineral fibres to an electrode with the exception of the marginal portions of its frame; covering the electrode and said fibres with rubber latex; allowing said latex to penetrate completely through said fibres to the surface of the electrode, the excess latex filling the spaces between the ribs in said mold; and effecting coagulation and vulcanisation in the mold.

4. Process of making a combined electrode, diaphragm and separator in a mold, which comprises applying a layer of unattackable, insulating, mineral fibres to an electrode with the exception of the marginal portions of its frame; covering the electrode and said fibres with rubber latex; allowing said latex to penetrate completely through said fibres to the surface of the electrode, said latex after penetration being of greater thickness than said layer of fibres; and effecting coagulation and vulcanisation in the mold.

5. Process of making a combined electrode, diaphragm and separator in a mold, which comprises applying a layer of unattackable, insulating, mineral fibres to an electrode before formation; covering the electrode and said fibres with rubber latex; allowing said latex to penetrate completely through said fibres to the surface of the electrode, said latex after penetration being of greater thickness than said layer of fibres; and effecting coagulation and vulcanisation in the mold.

LUCIEN JULES JUMAU.